US008890361B2

(12) United States Patent  (10) Patent No.: US 8,890,361 B2
Gard  (45) Date of Patent: *Nov. 18, 2014

(54) ELECTRIC HORIZONTAL DIRECTIONAL DRILLING MACHINE SYSTEM

(75) Inventor: Michael F. Gard, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 568 days.

This patent is subject to a terminal disclaimer.

(21) Appl. No.: 13/016,446

(22) Filed: Jan. 28, 2011

(65) Prior Publication Data

US 2011/0132665 A1  Jun. 9, 2011

Related U.S. Application Data

(63) Continuation of application No. 12/330,320, filed on Dec. 8, 2008, now Pat. No. 7,880,336, which is a continuation of application No. 11/456,800, filed on Jul. 11, 2006, now Pat. No. 7,461,707.

(60) Provisional application No. 60/698,244, filed on Jul. 11, 2005.

(51) Int. Cl.
*H02J 1/00* (2006.01)
*H02J 3/00* (2006.01)
*E21B 7/04* (2006.01)

(52) U.S. Cl.
CPC ..................................... *E21B 7/046* (2013.01)
USPC .......................................................... 307/82

(58) Field of Classification Search
USPC .................. 307/45, 58, 82; 175/61
See application file for complete search history.

(56) References Cited

U.S. PATENT DOCUMENTS

| | | | |
|---|---|---|---|
| 3,539,915 A | 11/1970 | Wood et al. |
| 3,611,101 A | 10/1971 | Kiffmeyer et al. |
| 4,719,557 A | 1/1988 | Forstbauer et al. |
| 4,857,696 A | 8/1989 | Taeusch et al. |
| 6,058,032 A | 5/2000 | Yamanaka et al. |
| 6,075,717 A | 6/2000 | Kumar et al. |
| 6,534,208 B1 | 3/2003 | Zinser |
| 6,544,208 B2 | 4/2003 | Ethier et al. |
| 6,845,825 B2 | 1/2005 | Bischel et al. |
| 6,940,735 B2 | 9/2005 | Deng et al. |

(Continued)

FOREIGN PATENT DOCUMENTS

| DE | 19951584 A1 | 5/2001 |
|---|---|---|
| DE | 10306336 A1 | 8/2003 |

(Continued)

OTHER PUBLICATIONS

Nuvera, "PowerFlow™ Fuel Cell Power Module", Flyer handed out at conference May 2005.

*Primary Examiner* — Carlos Amaya
(74) *Attorney, Agent, or Firm* — Tomlinson Rust McKinstry Grable

(57) ABSTRACT

An electric horizontal directional drilling machine. An electric horizontal directional drilling machine is powered by an electric power assembly. The power assembly is made up of a fuel cell and inverter, or multiple fuel cells with synchronized inverters. The electric motor operates hydraulic pumps or works independently to rotate, advance and retract a drill string and downhole tool through the earth and operate various machine functions. Mechanical functions of the drilling machine may also be satisfied through the use of electric rotary actuators (e.g., motors) and linear actuators (e.g., linear motors and solenoids).

21 Claims, 5 Drawing Sheets

(56) References Cited

U.S. PATENT DOCUMENTS

| | | |
|---|---|---|
| 7,248,490 B2 * | 7/2007 | Olsen et al. ............... 363/71 |
| 7,461,707 B2 * | 12/2008 | Gard ............... 175/170 |
| 7,880,336 B2 * | 2/2011 | Gard ............... 307/82 |
| 2001/0052433 A1 | 12/2001 | Harris et al. |
| 2002/0112893 A1 * | 8/2002 | Bischel et al. ............... 175/61 |
| 2002/0157870 A1 | 10/2002 | Bischel et al. |
| 2003/0205409 A1 | 11/2003 | Koch et al. |
| 2004/0004402 A1 | 1/2004 | Kippley |
| 2004/0072048 A1 | 4/2004 | Scheible et al. |
| 2008/0073123 A1 * | 3/2008 | Mullins et al. ............... 175/62 |

FOREIGN PATENT DOCUMENTS

| | | |
|---|---|---|
| EP | 1309026 A1 | 7/2003 |
| WO | 03069718 A1 | 8/2003 |
| WO | 2006086412 A2 | 8/2008 |

* cited by examiner

ELECTRIC HORIZONTAL DIRECTIONAL DRILLING MACHINE SYSTEM

CROSS REFERENCE TO RELATED APPLICATION

This application claims the benefit of U.S. application Ser. No. 12/330,320 filed Dec. 8, 2008 which is a continuation of Ser. No. 11/456,800 filed Jul. 11, 2006, now U.S. Pat. No. 7,461,707, which claims the benefit of U.S. Provisional Application No. 60/698,244 filed Jul. 11, 2005, the contents of all which are incorporated fully herein by reference.

FIELD OF THE INVENTION

The present invention relates to machines used to form horizontally deviated boreholes in the upper portion of the Earth's surface. More particularly, the present invention relates to electrically powered machines for horizontal direction drilling.

BACKGROUND OF THE INVENTION

Horizontal directional drilling (HDD) is a widely accepted construction alternative to open-cut trenching. The use of HDD is preferred in many construction applications because it can emplace utility lines and conduits, such as power lines, gas lines, telephone lines, and fiber optic cables, without disturbing surface structures (roads and sidewalks), existing landscaping, trees, and shrubs; or when open-cut trenching is impractical or impossible because of existing surface structures or other obstacles such as rivers, streams, lakes, and ponds. HDD emplaces these utility structures by forming a borehole under the surface of the earth without open-cut trenching.

HDD activities are intrinsically transient or itinerant. The HDD machine typically is brought to the jobsite by truck or trailer, along with all necessary drilling components, tools, and adjuncts (drill string or pipes, water tanks, water, drilling mud, conduits, and the like). The HDD machine is taken from the truck or trailer and placed on the ground in a proper orientation with respect to the intended drill path. A small pit, called the entrance pit, typically is dug slightly ahead of the HDD machine to allow the drill string and drill bit to enter the ground at the correct orientation. The HDD machine then advances the drill string through the ground as it is navigated by various means known to those skilled in the art. The HDD machine typically continues to advance the drill string and drill bit until the drill hit reaches the desired location. Typically, a small pit (called the exit pit or target pit) is dug as the far terminus of the bore path.

The product line (typically a power line, gas line, telephone line, fiber optic cable, or other underground utility) is then installed in the borehole by any of several different techniques. If the product line is small and of a suitable construction, it may be attached to the end of the drill bit—or to a special fitting which replaces the drill bit—and simply may be pulled through the newly-created bore hole as sections of drill string are removed from the machine end of the drill string. In other cases, a small-diameter conduit (for example, PVC plastic conduit) may be attached to the end of the drill bit and pulled through the newly created bore hole as drill rod is removed from the machine end of the drill string. Once the conduit is emplaced, product lines may be either pulled or blown through the newly emplaced conduit. If the product lines are large in diameter, as might be the case for water lines, the drill bit is replaced by a larger-diameter backreamer which is, in turn, connected to the product line or a conduit. The backreamer enlarges the borehole as the backreamer and product line or conduit are pulled back through the borehole while drill rod is removed from the machine end of the drill string. After the product is installed, connections are made at the entrance and exit pits and the pits are then filled with earth, at which time the HDD machine with its related apparatus is placed back on the truck or trailer for removal to the next job site or to a storage facility in anticipation of the next job.

A typical contemporary HDD machine consists of a number of specialized mechanisms and mechanical devices. For example, the prime mover (or primary source of operating power) is an internal combustion engine. The internal combustion engine is almost always a diesel engine, although smaller units may occasionally employ gasoline engines. The internal combustion engine then drives mechanisms and devices which generate thrust and pullback forces (advancing or retracting the drill string) and rotational forces (rotating the drill string in the desired direction). The internal combustion engine also operates other equipment, such as a hydraulic pump, providing operating power to various machine mechanisms such as pipe grippers (vise jaws which grip the drill pipe while making or breaking connections between individual drill rod segments), hydraulic motors providing operating power to install anchoring augers, positioning mechanisms to raise and lower the machine frame, and rod handlers to reduce the amount of manual effort required to add or store drill rod before or after use. Machine operation is often done using hydraulic valves and hydraulic cylinders; although some HDD machines have machine controllers which are electrically powered and which, in some cases, provide varying degrees of machine automation.

An alternative embodiment of the drill string described above is a two-pipe system with each section of drill string comprising an outer and an inner drill string that are independently rotatable. Dual-member drill strings are comprised of a plurality of pipe joints, each of which comprises an inner member supported inside an outer pipe or member. The inner member of the drill pipe constantly drives rotation of the boring head and drill bit to excavate the formation, and the outer member of the drill string is selectively rotated to align a steering mechanism to change the direction of the borehole while the rotating bit continues to drill. An exemplary HDD system is disclosed in U.S. Pat. No. 5,682,956, the content of which is incorporated herein in its entirety.

Internal combustion engines are the mainstay of portable construction equipment, and they have a great many desirable features for industrial applications. These features include portability, maturity of the technology, generally acceptable reliability, and the use of readily available fuel.

The present invention teaches the use of electrically powered underground construction and ancillary equipment to avoid any potential drawbacks associated with internal combustion engines. The objective of the present invention is to provide operating power by means of fuel cells. The advantages of this invention are set forth in the following paragraphs.

SUMMARY OF THE INVENTION

This invention is directed to an electrically powered horizontal drilling machine. The machine comprises a machine frame comprising a drive system, a drill string comprising a first end and a second end, a coupling device to engage the first end of the drill string to the drive system, a downhole tool, an actuator, and at least one electric motor. The downhole tool is connected to the second end of the drill string. The actuator applies thrust and retracts the drill string and downhole tool. The electric motor drives operation of the actuator and rotation of the downhole tool.

In another embodiment, the invention is directed to a method for rotating a downhole tool. The method comprises providing direct current electric power, converting the direct current electric power to alternating current electric power, operating an electric motor with the alternating current electric power, and rotating a drill string connected to the downhole tool, wherein the drill string is rotated by operation of the electric motor.

DESCRIPTION OF THE PREFERRED EMBODIMENT

The present invention contemplates a first embodiment that replaces the internal combustion engine prime mover with an electric motor or electric motors while retaining conventional hydraulic machine mechanisms. A second embodiment replaces all present-day hydraulic functions, actuators, and effectors with electrical apparatus, specifically including motors for rotary functions and linear actuators or other arrangements for thrust. Another alternative incorporates fuel cells as the primary power source rather than a conventional electromechanical generator set or an electrical connection to the commercial electrical power grid.

The scope of this invention extends to all necessary ancillary apparatus, including vacuum extractors, mud mixers, and mud pumps. In all cases, replacement of internal combustion engines by electrical actuators is highly desirable, and the use of fuel cells to provide operating power to the electric actuators is most desirable.

Figure 1:
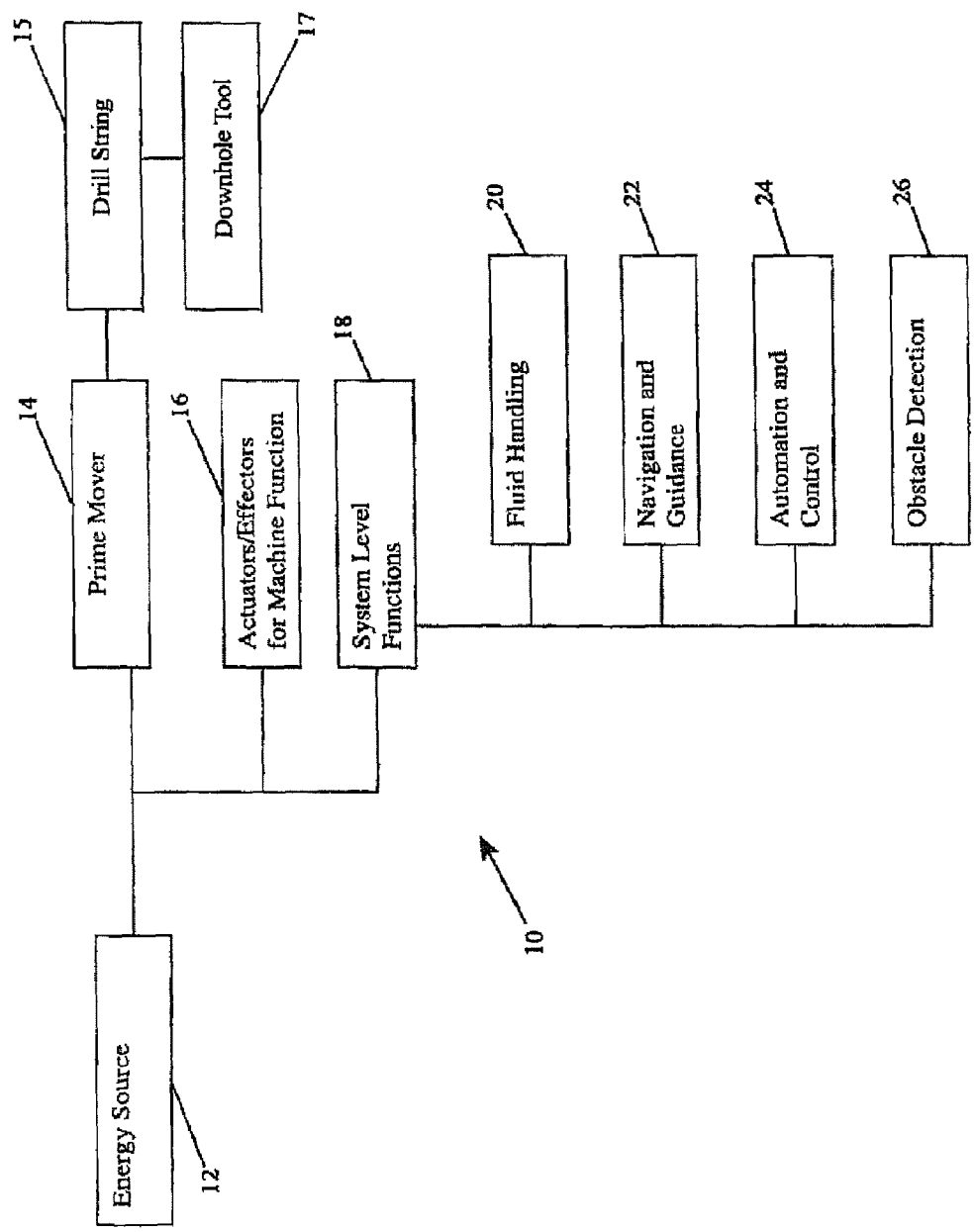
FIG. 1 is a schematic view of a horizontal directional drilling machine of the present invention.

With reference now to the drawings in general and to FIG. 1 in particular, there is shown therein a schematic representation of a HDD drilling machine 10. The machine 10 operates using an energy source 12. In conventional HDD drilling machines, the energy source 12 is a petroleum-based fuel such as gasoline or diesel fuel. In accordance with the present invention as yet to be described, the fuel source 12 may be electrical power provided by various sources. In a conventional HDD drilling machine 10 where the energy source 12 is petroleum-based fuel, the energy source is converted to mechanical power by the prime mover or movers 14—such as gasoline or diesel internal combustion engines—which convert the hydrocarbon fuel's energy content to mechanical power by the combustion process, as is well known in the mechanical arts. The engines, or prime movers 14, are connected to and drive the rotation and movement of the drill string 15 and consequently the downhole tool 17.

The HDD machine 10 also makes use of many different actuators 16 and effectors for various machine functions. These actuators 16 and effectors are often hydraulic mechanisms deriving their operating power from hydraulic pumps driven by the prime mover 14. Other devices in the actuator/effector 16 category are control valves and the like which direct hydraulic energy to hydraulic cylinders or other apparatus to produce a desired action.

There are, at the system level, certain system functions 18 which may or may not be present on a given HDD machine 10. Examples of system-level functions 18 are fluid handling components 20 (mud mixers and mud pumps) which provide the drilling fluids normally required during the HDD process; navigation, guidance, and control elements 22 which provide the HDD machine operator with information needed to guide the drill bit through the subsurface to the desired exit point; machine automation and control functions 24 which reduce the amount of manual effort required to perform the bore: and obstacle detection apparatus 26 which, in conjunction with the navigation, guidance, and control elements 22, help avoid existing subsurface infrastructure and perform a safer bore.

Many of the system functions operate somewhat or entirely independently of other system functions. For example, navigation, guidance, and control elements 22 ordinarily are provided from units which are functionally separate from the machine control functions. The integrating entity in commercial HDD practice is usually the HDD machine operator, and successful integration of the disparate system elements is largely a matter of individual operator interest, ability, and attentiveness.

Figure 2:
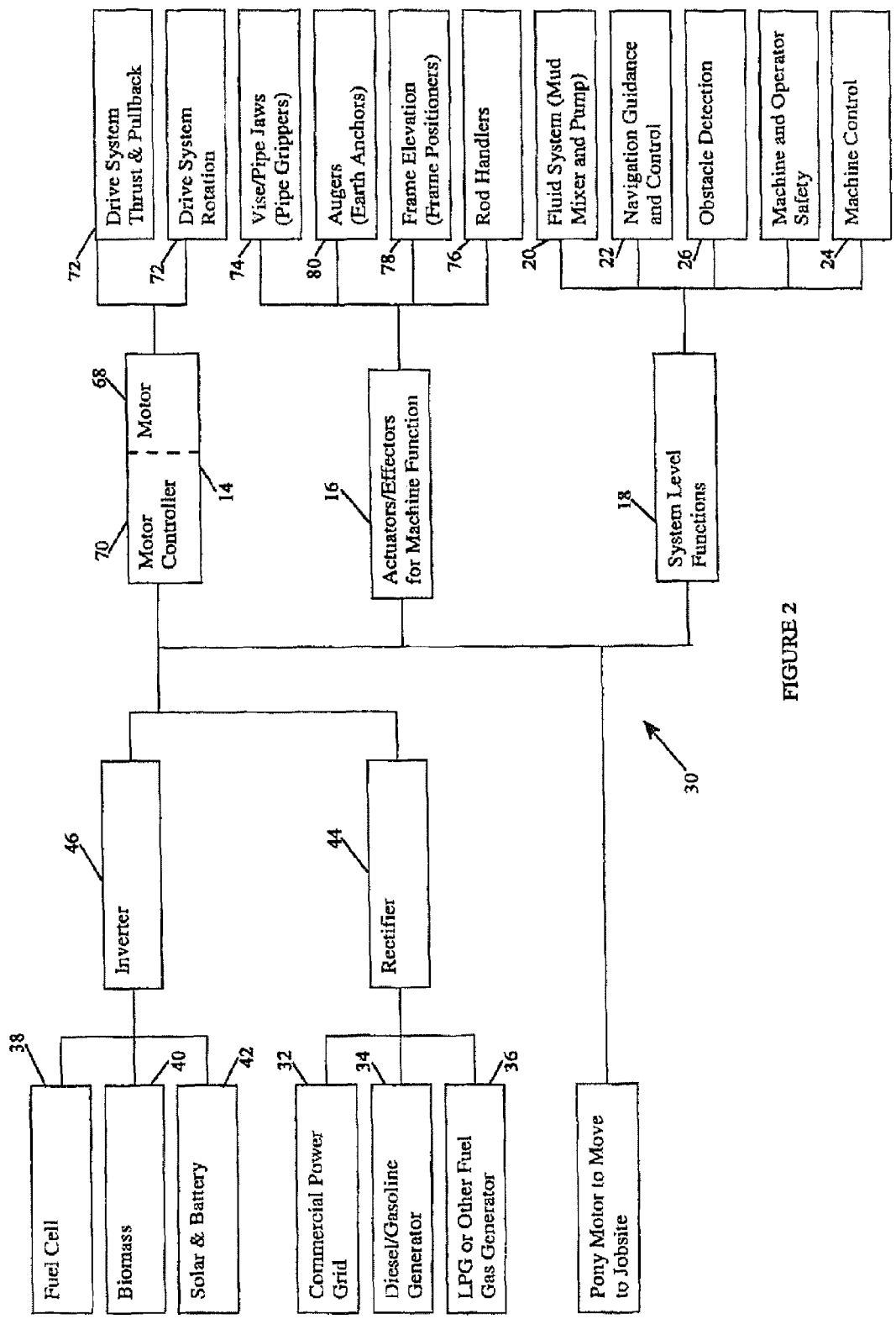
FIG. 2 is a block diagram for an electrically powered drilling machine designed in accordance with the present invention.

Referring now to FIG. 2, a detailed block diagram of a HDD system in accordance with the present invention is shown. The information in FIG. 2 may be related to the high-level function description provided by FIG. 1 as discussed in detail in the following paragraphs.

Power Sources

The HDD system 30 of the present invention may draw operating power from a number of significantly different electrical power sources. Electrical power sources may be alternating current (AC) electrical power sources. As shown in FIG. 2, suitable AC power sources would include, but are not limited to, the commercial electrical power grid 32, diesel or gasoline 34, and LPG or other fuel gas electromechanical generator sets 36. Satisfactory electromechanical generator sets are available from a number of commercial sources and represent mature technologies. The output of most generator sets 36 typically is a single-phase or multi-phase alternating current (AC) waveform, but an AC waveform is not a requirement. As will be discussed later, the present invention could make highly effective use of generator sets with direct current (DC) outputs.

The HDD system 30 of the present invention may also use direct current (DC) electrical power sources. The preferred DC power source, as shown in FIG. 2, is a fuel cell 38 which, as is known to those skilled in the appropriate arts, produces DC electricity from a variety of energy feedstocks without combustion—the energy conversion is produced by direct chemical reaction. Thus, suitable fuel cell 38 feedstocks may be—depending on fuel cell type—gasoline, suitably prepared diesel fuel, JP-4, LPG liquids, compressed natural gas, hydrogen, kerosene, and other typically hydrogen-rich feedstock fuels. Among the many advantages of fuel cells 32 is the ability to produce electrical energy from familiar, commonly available petroleum-based fuels without the need for combustion. The byproducts of fuel cell 32 operation are generally water and carbon dioxide, but without the noxious gaseous and particulate byproducts associated with combustion. However, alternative sources of DC electricity could be used, including such sources as biomass digesters 40, solar power or lead-acid storage batteries 42, and the like.

The HDD system 30 of the present invention includes two devices which permit the HDD machine 30 to operate from almost any electrical power source. The first device is a rectifier assembly 44 which is used to produce DC power from an AC source, as is well known in the electrical arts. The second device is an inverter 46, also known to those skilled in the electrical arts, which is used to produce AC power from a DC source. As will be discussed below, a particular type of inverter 46 is a critical system component for effective fuel cell 38 use.

Fuel Cells and Synchronized Inverters

The ability to use electrical power from a variety of sources is a particularly acute requirement for the successful application of fuel cells 38, a highly preferred source of electrical power. A fuel cell 38 typically delivers DC power at various voltages. Contemporary fuel cells 38 with power ratings in the multiple kilowatt range often provide either 28 Volt or 48 Volt DC power, but fuel cell output voltages are not yet standardized. Fuel cells are in an early stage of development at the present time, and fuel cells capable of providing power for machines with horsepower ratings required for HDD applications are relatively few. However, 5 kW to 10 kW rated fuel cells are commercially available on a limited basis, although devices of widely varying power ratings are available in one form or another.

This is a serious complication for would-be fuel cell 38 users who must provide a prime mover 14 (i.e., a large electric motor or motors) with adequate power for the task at hand, but who also must cope with power sources of significantly different characteristics and capabilities. The present invention provides a modular solution to the source power/load power problem.

It is a specific feature of the present invention to provide a means whereby fuel cells 38 may be used in modular or even standardized modular, power increments. For the sake of example only, assume the existence of a reliable standard commercial 5 kW fuel cell 38 unit. We now describe how multiple 5 kW fuel cells may be economically combined to supply operating power, in 5 kW increments, to a wide range of different electric motors by the use of synchronized AC power inverters.

For example, assume an HDD machine 30 may require 20 HP maximum shaft horsepower for an HDD application. For this discussion, assume the conversion between mechanical power and electrical power is given by the well-known approximation 1.00 HP=0.75 kW. Then, a 100% efficient mechanical device delivering 20 HP shaft horsepower would require 15 kW of source electrical power. It would be particularly desirable to provide this power using multiple standard modular fuel cells 38 of, say, 5 kW rated capacity if such fuel cells were readily available from a commercial source. This desire to achieve the required power capacity may be realized by multiple inverter units 46 capable of being synchronized with other inverters using a synchronizer 48.

Figure 3:
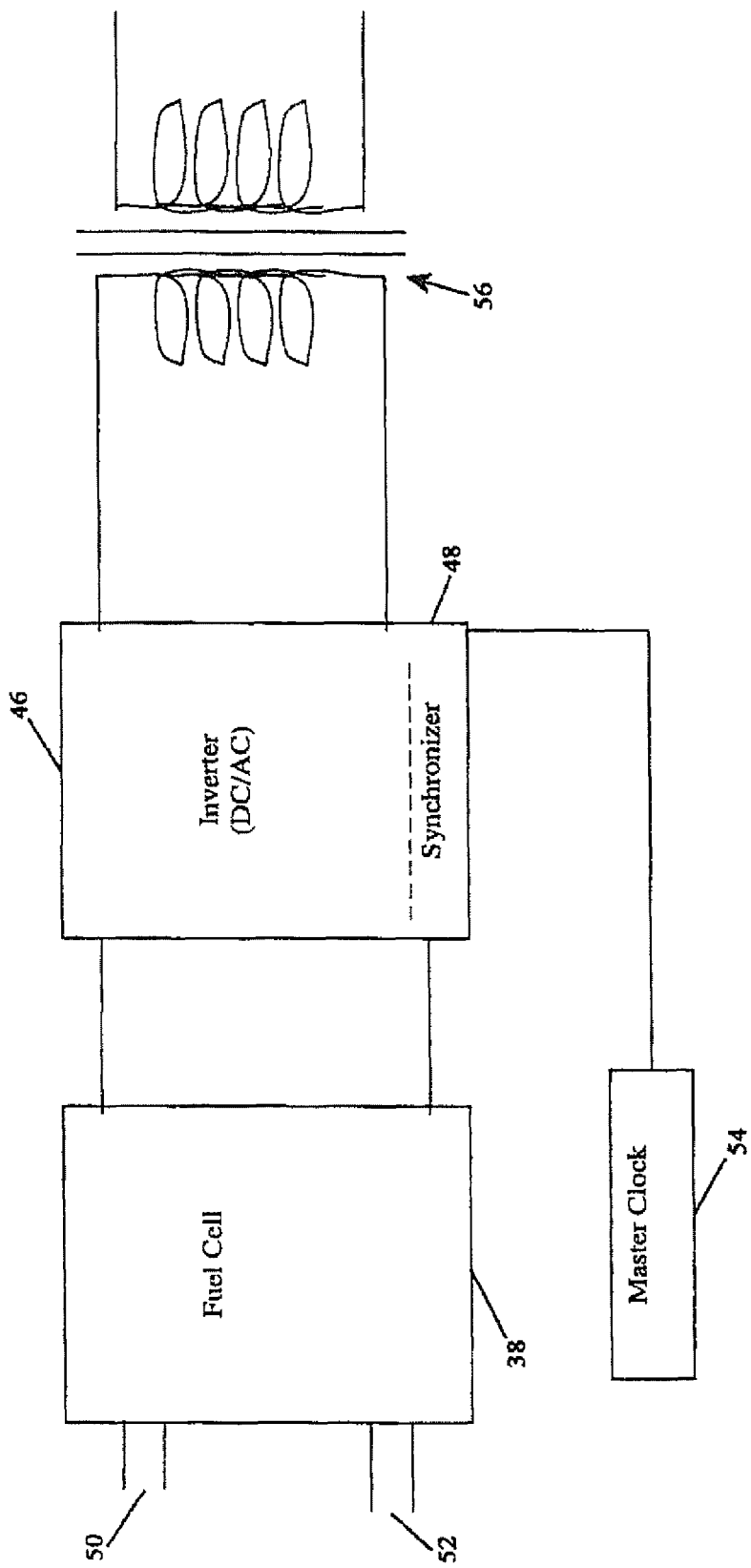
FIG. 3 illustrates a fuel cell-inverter combination for use with the present invention.

As shown in FIG. 3, the fuel cell 38 provides DC power and is operatively connected to the inverter 46. As previously discussed, the fuel cell 38 may have a feedstock input 50 and an exhaust or byproduct capability 52. The inverter 46 converts the DC power from the fuel cell to AC, and may be used with a clock 54 and synchronizer 48 for combining multiple fuel cell 38 inputs. The AC power output from the inverter 46 may also be provided to a transformer unit 56 for appropriate voltage regulation as needed.

Again, for the sake of example only, assume 100% efficient energy conversion in the electrical inverters. The arrangement of FIG. 3 allows fuel cells 38 to produce power in 5 kW increments at a nominal output voltage of, for example, 48 VDC. Using synchronous inverters 46, electrical power from each individual fuel cell 38 is efficiently transformed and combined into a single AC power source especially advantageous for use with commercially available AC motor controllers and AC motors. If a larger, later, HDD machine 30 should require a 40 HP (30 kW) electric motor, six identical 5 kW fuel cell/inverter units could be used to produce the required electrical power using a single standardized fuel cell/inverter modular power unit. The flexibility, redundancy, and economies of scale of this arrangement are noteworthy and are identified as particular objectives of the present invention.

In addition, the ability to synchronize power inverters now allows the ability to mix fuel cell units of different power capacities and operating voltages. For example, it now does not matter that one fuel cell may be rated at 5 kW, 28 VDC, while another fuel cell may be rated at 10 kW, 48 VDC—if both inverters are capable of producing the same AC output voltage from a reasonable range of DC input voltages and may be synchronized, each fuel cell can operate in optimal fashion while relying on the synchronization of their respective inverters to present a single AC power line with desired AC output amplitude and frequency. Thus, the wide-input synchronized inverter is a key component in the ability to use mixed-characteristic fuel cells and other DC power sources to produce AC power suitable for HDD machine use.

Figure 4:
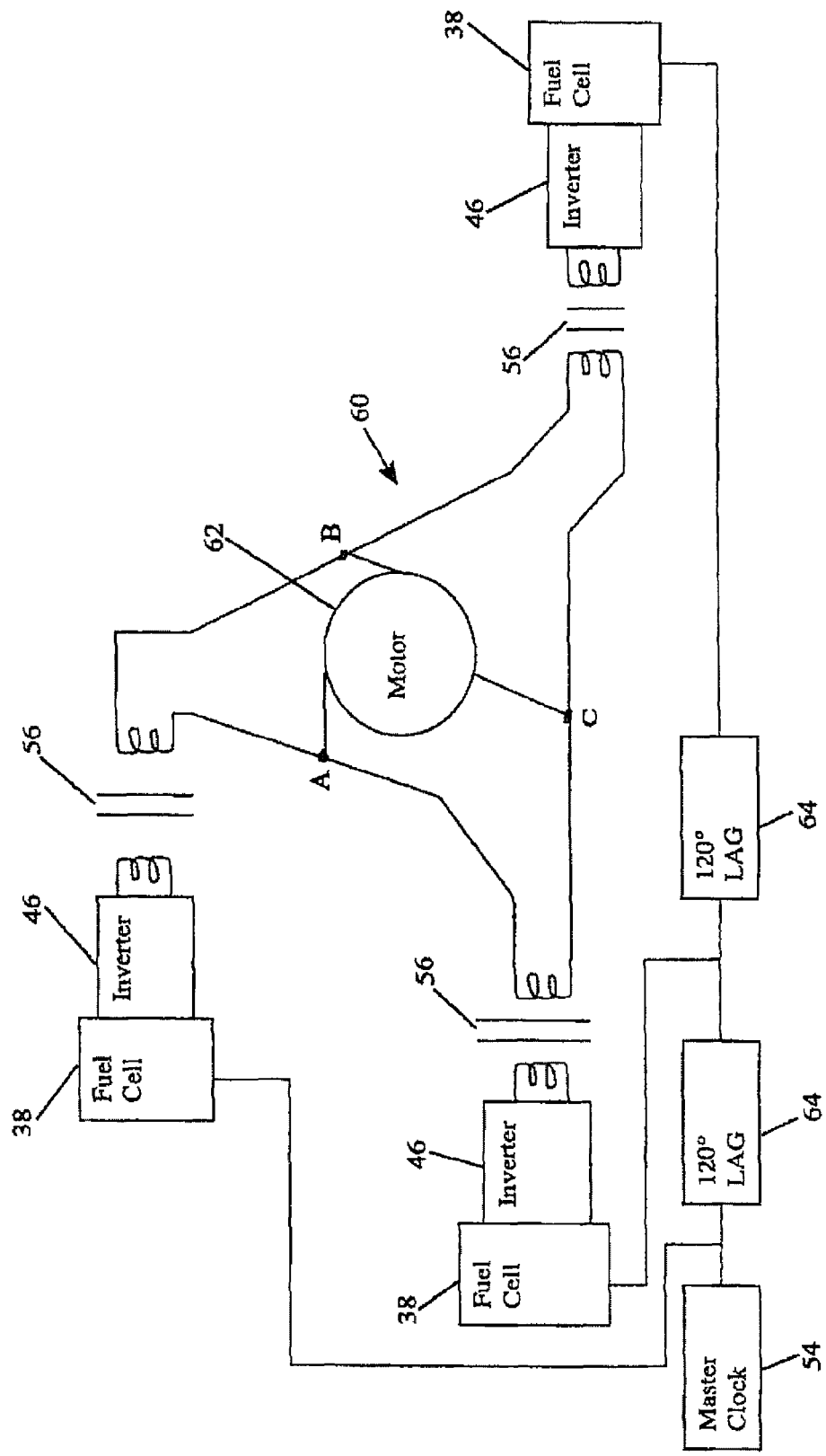
FIG. 4 shows a three phase example of fuel cell-inverter combinations for use with the present invention.

FIG. 4 illustrates one way to implement the inventive concept. In FIG. 4, each fuel cell 38 and inverter 46 makes up a single-phase AC power unit 58. Each fuel cell/inverter power unit 58 is designated as master unit or follower unit according to its position in a power assembly 60—the fuel cell/inverter power units 58 themselves are identical and completely interchangeable. The AC electrical power output from each single-phase fuel cell/inverter power unit 58 may be connected using transformers 56 to a three-phase transformer or, as shown, is directly connected with others to form a power assembly, and in particular a three-phase power source 62, for a typical electric motor controller. A three-phase power transformer, if used, may be either a wye-connected or delta-connected transformer.

Proper phasing between inverters 46 is maintained by electrical lead/lag networks 64 (note that 240° of lag is electrically equivalent to 120° of lead) in the power connection assembly 60, making it possible for all inverters to be identical. Likewise, the master clock 54 setting the frequency is located on the assembly 60—each single-phase fuel cell/inverter unit 58 synchronizes itself to the master clock. In a preferred implementation, the master clock 54 will incorporate the phasing networks, or their digital equivalent, to produce three tightly synchronized clock signals which establish highly accurate phase relationships between the individual units. According to the local requirements in the geographical location in which a given HDD machine 30 is to be used, the master clock 54 may be adjusted to provide 50 Hz operation, rather than 60 Hz operation, if desired. Other frequencies of operation (for example, 400 Hz) can be used if desired—the frequencies used in this discussion are presented for illustration only and should not be construed to be limiting in any respect.

Figure 5:
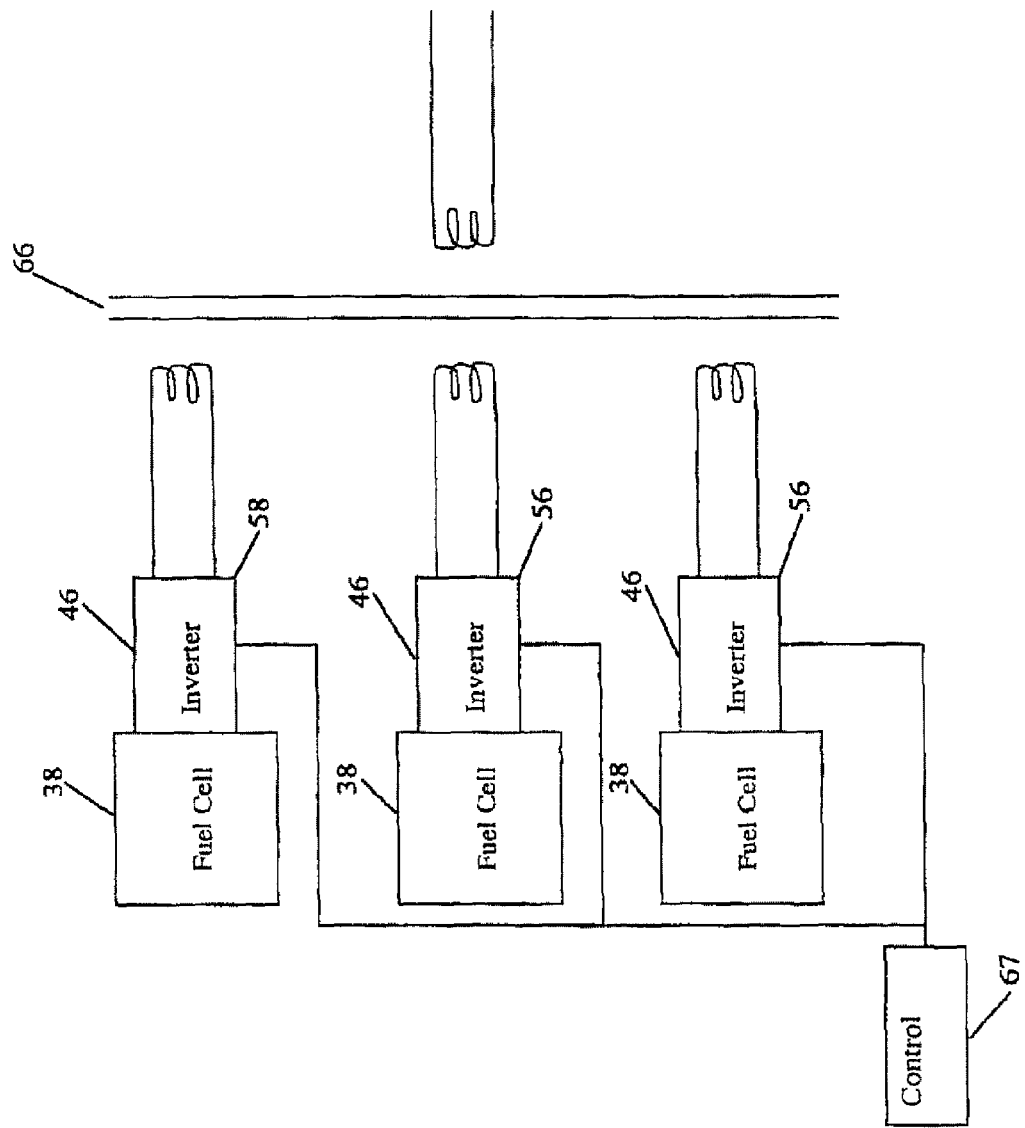
FIG. 5 illustrates single phase example of fuel cell-inverter combinations for use with the present invention.

Referring now to FIG. 5, there is shown therein a single-phase implementation of a power assembly for the present invention. For simplicity, the individual fuel cell 38 and inverter 46 combination units 58 do not contain individual transformers. Instead, each unit is connected to a corresponding winding on a large multiple-primary, single-secondary transformer 66 which then combines the power from each fuel cell/inverter combination unit 58 by transformer action. In the single-phase case, no master/follower designation is necessary since the output of each unit 58 is understood to maintain the same phase relationship with the master clock 54. A control unit 67 is preferably included and operatively connected to the inverters 46 in each of the power units 58. The control unit 67 provides control signals to the inverters 38, allowing the inverters to maintain frequency and amplitude in response to the control signals. This arrangement is especially flexible, as the individual fuel cell/inverter units 58 may have considerably different ratings as individual units—the process of power addition is done by the multiple-primary transformer 66. Those familiar with the electrical arts will appreciate that the arrangement of FIG. 5 may be generalized to a poly-phase arrangement within the spirit of this teaching.

FIGS. 4 and 5 are presented for purposes of illustration only and are not to be considered limiting in any respect. There is a rich background of technology in the electrical arts associated with electrical power generation and electrical power distribution, and teachings from this pool of knowledge may be used to form many other combinations which are considered to be within the scope of this invention.

Prime Movers

With reference again to FIG. 2, the prime mover 14 for use with the HDD machine 30 of the present invention is preferably composed of two distinct yet tightly interconnected pieces—the electric motor 68 and the motor controller 70. The electric motor 68 may be a single-phase or polyphase AC machine, but it may also be a DC machine. The motor 68 is operatively connected to the drive system 72 of the HDD machine 30 to control thrust/pullback and rotation of the drill string.

In most cases, the HDD machine 30 will preferably use one or more three-phase AC motors or one or more large DC motors as the prime mover 14. Each motor type (AC or DC) has its own operating characteristics, and engineering tradeoffs between motor types can be made to obtain operating characteristics most important to a particular HDD machine 30 design. For example, the electric HDD machines 30 referenced above may incorporate three-phase variable speed AC motors to provide the greatest flexibility in controlling direction and speed of rotation, even though a DC motor might be the motor of choice for another type of HDD machine in which exceptional low-speed rotating torque is the predominant consideration. Such differences in electric motor operating characteristics can give electric motors pronounced advantages over internal combustion engines in many operating regimes.

The other portion of the prime mover 14—the motor controller 70—is a device which translates operator commands into appropriate modifications of the motor's 68 power source. The motor controller 70 may do nothing more than control motor 68 speed and the direction of rotation, or the controller may provide sophisticated programming with controlled torque profiles, different operating speed ranges, programmed accelerations and decelerations, and high-speed data communication between the motor controller 70, a computer (not shown), and a display unit (not shown). The sophistication of existing commercial motor controllers gives an electric HDD unit functional capabilities not readily available with conventional mechanical and hydraulic HDD machine controls.

In many cases, the motor controller 70 contains a power supply which converts AC input power to DC, then inverts the DC power thus produced to provide variable frequency, variable amplitude polyphase AC power to the motor 68. Such controllers 70 may be used very effectively with the fuel cell 38 and synchronous inverter 46 combination already described, since many motor controllers can operate from single-phase AC, polyphase AC, or even DC input power of suitable magnitude.

Actuators and Effectors

Machine actuators and effectors 16 are those mechanisms which provide functional capability to the machine 30 allowing the operator to add or remove drill pipe in the drill string using pipe grippers 74, store and retrieve drill pipe in the pipe box using drill pipe or rod handlers 76, position the machine frame before the job starts with frame positioners 78, anchor the machine to the ground to withstand reaction forces during drilling using an anchoring system 80, apply lubricant to drill pipe fittings to prevent sticking and galling, and so on. Those skilled in the art will appreciate that an encyclopedic listing of all actuators and effectors 16 is difficult, if not impossible, because these mechanisms continue to evolve as HDD machines 30 become more sophisticated, increasingly safer, and easier to use.

A great many HDD machines use hydraulic motors to rotate the drill pipe, and for this reason hydraulic power is readily available on most HDD machines. As a consequence, many actuators and effectors 16 are hydraulically operated. Mid-range and more sophisticated HDD machines 30 often have at least a rudimentary electrical system for various purposes, including machine control, safety features, and automation functions. It must be emphasized that a great many electric actuators are possible in an electric HDD machine 30. An electric HDD machine 30 is more amenable to electric actuators, electric control, and automation by virtue of the flexibility and sophistication of commercial electric motor controllers. Specifically, familiar functions now existing on contemporary internal combustion engine driven HDD machines will be provided using significantly different technologies in an electrically driven HDD machine. These developments will be part of the natural evolution of the electric HDD machine 30.

For example, many existing HDD machines use hydraulically operated vise jaws as grippers 74 which hold the drill pipe while pipe connections are being made up or broken apart. It is not difficult to imagine that equally effective, if not superior, gripping mechanisms will be developed using solenoid-actuated vise jaws, electromagnetic grippers, electric motors and ball screws, and similar developments. Linear motors or conventional electric motors and captive ball screws can accomplish other HDD actuator and effector 16 tasks such as positioning and leveling. Drill rod positioners and drill rod handlers 76 have similar opportunities for electromechanical developments which fit effectively and efficiently in the all-electric HDD machine 30 concept.

System-Level Functions

The fluid system 20 provides the mixing and pressurized delivery of fluid, most often water-based drilling mud, to the HDD machine 30 and drill string. Drilling fluid is forced down the drill pipe annulus, exiting the drill pipe annulus via a small nozzle or nozzles immediately behind the drill bit. Drilling fluid has a number of important functions, including lubrication of the drill bit and drill pipe in the borehole, stabilization of the borehole, cooling the drill bit, and carrying cuttings from the borehole to the surface. The fluid tanks are normally located on a trailer remote from the HDD machine 30, although smaller HDD machines may have a self-contained mud tank as part of the HDD unit. The fluid system 20 mixes dry drilling mud preparations with water and then maintains some level of circulation to prevent settling in the fluid tank. The fluid system 20 provides a pump to force the drilling fluid through a hose to the HDD machine 30, where the fluid enters the drill pipe annulus through a special swivel. Failure of the fluid system ordinarily brings HDD operations to a halt until the problem is rectified.

Although the fluid system 20 is an essential part of most HDD operations, it is often treated as a separate unit. The present invention specifically identifies the desirability of providing fluid system 20 status information to the HDD machine 30 operator via an electrical, fiber-optic, RF, or IR data link. Likewise, the present invention specifically identifies the desirability of providing operator control of the fluid system via electrical, fiber-optic, RF, or IR data link from the operator's console. Many fluid systems 20 use a small gasoline-driven pump unit to mix and circulate drilling mud and then deliver drilling mud to the HDD machine swivel; this invention recognizes the desirability of replacing the small gasoline-driven pump unit by an electric motor powered through the fluid umbilical and controlled via electrical, fiber-optic, RF, or IR data link from the operator's console.

Navigation and Guidance

Efficient borehole creation is a major objective of the HDD machine 30, but navigation and guidance 22 of the bore path is of critical importance to success of the drilling operation. Those familiar with the art are aware that navigation and guidance 22 functions are relatively well developed yet still emerging, but existing navigation and guidance functions are largely independent of machine operation in practice. That is, navigation and guidance information may be provided by a variety of means, but navigation and guidance information ordinarily is communicated to the operator rather than directly to machine control elements.

Electric motors 68 and motor controllers 70 are particularly designed for electrical/electronic interfaces, making the long-sought automation of the boring process far easier to accomplish with an all-electric HDD machine 30 implementation. It is a particular aim of this invention to improve operator effectiveness by facilitating the interaction of electrical/electronic interfaces between navigation and guidance 22 electronics, the electric motor controller, and other HDD machine 30 functions.

Borepath Planning and Mapping

Integration of borepath planning and borepath mapping in the context of automated boring is far easier to accomplish using electric machines, their controllers, and all-electric actuators.

Obstacle Detection

Rapid and efficient borehole creation is of little consequence if the borehole is in the wrong place or if the drill bit strikes existing infrastructure during the boring process. Electric motors 68 and motor controllers 70 are particularly designed for electrical/electronic interfaces and safety switches, whereas the diesel engine and hydraulic actuators typically found on existing HDD machines are far less conveniently adapted to electrical/electronic control intervention. It is a particular aim of this invention to improve obstacle detection by facilitating the interaction of electrical/electronic interfaces between obstacle detection 26 apparatus, the electric motor controller 70, and other HDD machine 30 functions.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

What is claimed is:

1. An electrically powered horizontal directional drilling machine comprising:
    a machine frame;
    at least one electric motor supported on the machine frame;
    an electric power assembly operatively connected to the electric motor, wherein the electric power assembly conditions an incoming current for use by the electric motor, the electric power assembly comprising:
        a plurality of inverters for converting a direct current to an alternating current; and
        a control unit operatively connected to each inverter wherein the control unit sends control signals to each inverter to maintain a timing relationship between the plurality of inverters,
    a drive system supported on the machine frame and powered by the at least one electric motor;
    a drill string comprising a first end and a second end;
    a coupling device to engage the first end of the drill string to the drive system;
    a downhole tool connected to the second end of the drill string; and
    an actuator powered by the at least one electric motor to apply thrust and retract the drill string and downhole tool.

2. The machine of claim 1 wherein each of the plurality of inverters is operatively connected to one of a plurality of direct current power sources.

3. The machine of claim 2 further comprising a transformer having a plurality of input windings and a single phase transformer output, wherein each of the plurality of inverters is connected to one of the plurality of input windings.

4. The machine of claim 2 further comprising a transformer having a plurality of input windings and a three-phase transformer output, wherein each of the plurality of inverters is connected to one of the plurality of input windings.

5. The machine of claim 1 wherein each inverter is adapted to maintain frequency and amplitude in response to control signals from the control unit.

6. The machine of claim 1 wherein the direct current is provided by a fuel cell.

7. The machine of claim 1 further comprising an alternating current power source for powering the at least one electric rotation motor.

8. The machine of claim 7 further comprising at least one rectifier assembly to produce direct current power from the alternating current power source.

9. The machine of claim 8 further comprising at least one inverter, the at least one inverter operatively connected to the at least one rectifier;
    a transformer having an input winding and an output winding;
    wherein each of the at least one inverter is connected to the input winding;
    a control unit operatively connected to each inverter, wherein the control unit sends control signals to each inverter to maintain a timing relationship between the plurality of inverters.

10. The machine of claim 7 wherein the alternating current power source comprises a fuel generator.

11. The machine of claim 7 wherein the alternating current power source comprises an electric grid.

12. The machine of claim 1 wherein the actuator comprises at least one electric linear motor.

13. The machine of claim 1 wherein the actuator comprises at least one electric motor and at least one ball screw.

14. The machine of claim 1 wherein the coupling device comprises at least one gearbox.

15. The machine of claim 1 wherein the drill string comprises an inner pipe member and an outer pipe member, wherein the outer pipe member is located about and independently rotatable from the inner pipe member.

16. The electrically powered horizontal directional drilling machine of claim 1 wherein the electric power assembly is also supported on the machine frame.

17. A method for rotating a downhole tool comprising:
   providing direct current electric power;
   sending control signals to a plurality of inverters from a control unit;
   maintaining a timing relationship between a plurality of inverters in response to the control signals from the control unit;
   converting the direct current electric power to alternating current electric power;
   operating an electric motor with the alternating current electric power; and
   rotating a drill string connected to the downhole tool, wherein the drill string is rotated by operation of the electric motor.

18. The method of claim 17 wherein the drill string comprises an inner member and an outer member independently rotatable by the electric motor.

19. The method of claim 17 wherein the alternating current electric power is three-phase.

20. The method of claim 17 wherein the alternating current electric power is single phase.

21. An electrically powered horizontal directional drilling system comprising:
   a machine frame;
   an electrical power assembly comprising a plurality of inverters and a control unit to maintain a timing relationship between the plurality of inverters using control signals;
   at least one electric motor supported on the machine frame and powered by the electrical power assembly;
   a drive system powered by the at least one electric motor;
   a drill string comprising a first end and a second end;
   a coupling device powered by the at least one electric motor to engage the first end of the drill string;
   a downhole tool connected to the second end of the drill string; and
   an actuator powered by the at least one electric motor to apply thrust and retract the drill string and downhole tool.

* * * * *

UNITED STATES PATENT AND TRADEMARK OFFICE
CERTIFICATE OF CORRECTION

PATENT NO.         : 8,890,361 B2                                    Page 1 of 1
APPLICATION NO.    : 13/016446
DATED              : November 18, 2014
INVENTOR(S)        : Gard It is certified that error appears in the above-identified patent and that said Letters Patent is hereby corrected as shown below:

In the Specification

Column 1, line 49, please delete "hit" and substitute therefore --bit--.

Signed and Sealed this
Third Day of March, 2015

Michelle K. Lee
*Deputy Director of the United States Patent and Trademark Office*